United States Patent
Khlat

(10) Patent No.: US 12,003,173 B2
(45) Date of Patent: Jun. 4, 2024

(54) DIRECT CURRENT-TO-DIRECT CURRENT CONVERSION SYSTEM

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 213 days.

(21) Appl. No.: 17/522,455

(22) Filed: Nov. 9, 2021

(65) Prior Publication Data

US 2023/0146408 A1    May 11, 2023

(51) Int. Cl.
*H02M 3/07* (2006.01)
*H02M 1/08* (2006.01)

(52) U.S. Cl.
CPC ............. *H02M 3/07* (2013.01); *H02M 1/08* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H02M 2003/1566; H02M 2003/1557; H02M 2001/0012; H02M 2001/0009; H02M 2001/385; H04B 2215/069

See application file for complete search history.

(56) References Cited

U.S. PATENT DOCUMENTS

| | | | |
|---|---|---|---|
| 4,451,743 A | 5/1984 | Suzuki et al. | |
| 5,414,614 A | 5/1995 | Fette et al. | |
| 6,055,168 A | 4/2000 | Kotowski et al. | |
| 6,160,432 A | 12/2000 | Rhee et al. | |
| 6,169,673 B1 | 1/2001 | McIntyre et al. | |
| 6,188,274 B1 | 2/2001 | Vernon | |
| 6,819,197 B2 | 11/2004 | Maldonado | |
| 6,927,441 B2 | 8/2005 | Pappalardo et al. | |
| 6,937,487 B1 | 8/2005 | Bron | |
| 6,985,708 B2 | 1/2006 | Lin et al. | |

(Continued)

FOREIGN PATENT DOCUMENTS

WO    2009067591 A2    5/2009

OTHER PUBLICATIONS

Notice of Allowance for U.S. Appl. No. 16/831,935, dated Mar. 9, 2022, 7 pages.

(Continued)

*Primary Examiner* — Bryan R Perez
(74) *Attorney, Agent, or Firm* — Withrow & Terranova, P.L.L.C.

(57) ABSTRACT

A direct current-to-direct current conversion system is disclosed having a switch network configured to respond to control signals to selectably couple a first capacitor and a second capacitor between an input, a first output, and a second output. Also included is a switch controller configured to signal the switch network to couple the first capacitor and the second capacitor in series between the first output and a fixed voltage node and signal the switch network to couple the first capacitor and the second capacitor in series between the first output and the input. The switch controller is further configured to signal the switch network to couple the first capacitor and the second capacitor in parallel between the first output and the second output and signal the switch network to couple the first capacitor and the second capacitor between the second output and the fixed voltage node.

18 Claims, 4 Drawing Sheets

(56) References Cited

U.S. PATENT DOCUMENTS

| | | |
|---|---|---|
| 7,408,330 B1 | 8/2008 | Zhao |
| 7,456,677 B1 | 11/2008 | Rao et al. |
| 7,518,892 B2 | 4/2009 | Kitagawa et al. |
| 7,531,996 B2 | 5/2009 | Yang et al. |
| 7,622,900 B2 | 11/2009 | Komiya |
| 7,705,560 B2 | 4/2010 | Johnson |
| 7,714,546 B2 | 5/2010 | Kimura et al. |
| 7,855,535 B2 | 12/2010 | Tiew et al. |
| 7,884,665 B2 | 2/2011 | Saikusa et al. |
| 7,907,430 B2 | 3/2011 | Kularatna et al. |
| 7,952,424 B2 | 5/2011 | Sanduleanu et al. |
| 7,990,742 B2 | 8/2011 | Lesso |
| 8,000,117 B2 | 8/2011 | Petricek |
| 8,044,706 B2 | 10/2011 | Saman et al. |
| 8,089,787 B2 * | 1/2012 | Melse ............... H02M 3/07 363/62 |
| 8,089,788 B2 | 1/2012 | Jain |
| 8,223,514 B2 | 7/2012 | Kajino |
| 8,259,476 B2 | 9/2012 | Ben-Yaakov et al. |
| 8,427,205 B1 | 4/2013 | Nagaraj et al. |
| 8,564,985 B2 | 10/2013 | van Straaten |
| 8,619,445 B1 | 12/2013 | Low et al. |
| 8,710,911 B2 | 4/2014 | Chien |
| 8,854,019 B1 | 10/2014 | Levesque et al. |
| 9,069,365 B2 | 6/2015 | Brown et al. |
| 9,112,405 B2 * | 8/2015 | Enenkel ............... H05B 45/375 |
| 9,256,234 B2 | 2/2016 | Kay et al. |
| 9,280,163 B2 | 3/2016 | Kay et al. |
| 9,362,818 B2 | 6/2016 | Gorisse et al. |
| 9,484,809 B2 | 11/2016 | Floyd |
| 9,553,567 B2 | 1/2017 | Kadam |
| 9,653,944 B2 | 5/2017 | Teggatz et al. |
| 9,729,048 B2 | 8/2017 | Crandall et al. |
| 9,866,178 B2 | 1/2018 | Anderson |
| 10,090,809 B1 | 10/2018 | Khlat |
| 10,177,602 B2 | 1/2019 | Akram et al. |
| 10,277,072 B2 | 4/2019 | Yen et al. |
| 10,404,086 B2 | 9/2019 | Wu et al. |
| 10,404,175 B2 | 9/2019 | Chakraborty et al. |
| 10,439,624 B2 | 10/2019 | Schober et al. |
| 10,530,249 B1 | 1/2020 | Lee et al. |
| 10,615,687 B1 | 4/2020 | Khlat |
| 10,680,524 B2 | 6/2020 | Chen et al. |
| 10,707,840 B2 | 7/2020 | Bodano et al. |
| 10,879,796 B2 | 12/2020 | Khlat |
| 11,146,173 B1 | 10/2021 | Ramos |
| 11,594,959 B1 | 2/2023 | Merkin et al. |
| 2004/0167407 A1 | 8/2004 | Roberts |
| 2008/0157732 A1 | 7/2008 | Williams |
| 2009/0059630 A1 | 3/2009 | Williams |
| 2010/0259303 A1 | 10/2010 | Liao et al. |
| 2011/0101938 A1 | 5/2011 | Ma et al. |
| 2011/0227633 A1 | 9/2011 | Mo et al. |
| 2012/0001685 A1 | 1/2012 | Levine et al. |
| 2012/0062205 A1 | 3/2012 | Levesque et al. |
| 2015/0372592 A1 | 12/2015 | Floyd |
| 2017/0255250 A1 | 9/2017 | Ngo et al. |
| 2017/0257024 A1 | 9/2017 | Wu et al. |
| 2019/0115829 A1 | 4/2019 | Oporta et al. |
| 2019/0190284 A1 | 6/2019 | Pinto et al. |
| 2019/0207505 A1 | 7/2019 | Ramadass et al. |
| 2019/0280590 A1 | 9/2019 | Lee et al. |
| 2019/0386481 A1 | 12/2019 | Cho et al. |
| 2020/0014294 A1 | 1/2020 | Song et al. |
| 2020/0144913 A1 | 5/2020 | Harjani et al. |
| 2020/0389132 A1 | 12/2020 | Khlat et al. |
| 2021/0034085 A1 | 2/2021 | Mercer et al. |
| 2022/0416653 A1 | 12/2022 | Giuliano |

OTHER PUBLICATIONS

Non-Final Office Action for U.S. Appl. No. 12/567,318, dated May 29, 2012, 7 pages.

Final Office Action for U.S. Appl. No. 12/567,318, dated Oct. 22, 2012, 7 pages.

Non-Final Office Action for U.S. Appl. No. 12/567,318, dated Apr. 2, 2013, 5 pages.

Final Office Action for U.S. Appl. No. 12/567,318, dated Jul. 19, 2013, 7 pages.

Advisory Action for U.S. Appl. No. 12/567,318, dated Aug. 27, 2013, 3 pages.

Non-Final Office Action for U.S. Appl. No. 12/567,318, dated Oct. 24, 2013, 6 pages.

Notice of Allowance for U.S. Appl. No. 12/567,318, dated Feb. 18, 2014, 8 pages.

Non-Final Office Action for U.S. Appl. No. 13/013,986 dated Jun. 28, 2012, 13 pages.

Final Office Action for U.S. Appl. No. 13/013,986 dated Oct. 19, 2012, 16 pages.

Advisory Action for U.S. Appl. No. 13/013,986 dated Jan. 9, 2013, 6 pages.

Examiner's Answer to U.S. Appl. No. 13/013,986, dated Jun. 28, 2013, 26 pages.

Decision on Appeal for U.S. Appl. No. 13/013,986, dated Nov. 18, 2015, 7 pages.

Notice of Allowance for U.S. Appl. No. 13/013,986, dated Feb. 12, 2016, 9 pages.

Notice of Allowance for U.S. Appl. No. 16/448,762, dated Nov. 27, 2019, 9 pages.

Notice of Allowance for U.S. Appl. No. 16/787,706, dated Aug. 19, 2020, 10 pages.

Non-Final Office Action for U.S. Appl. No. 16/831,935, dated Oct. 6, 2021, 6 pages.

Notice of Allowance for U.S. Appl. No. 17/852,857, dated Apr. 7, 2023, 8 pages.

* cited by examiner

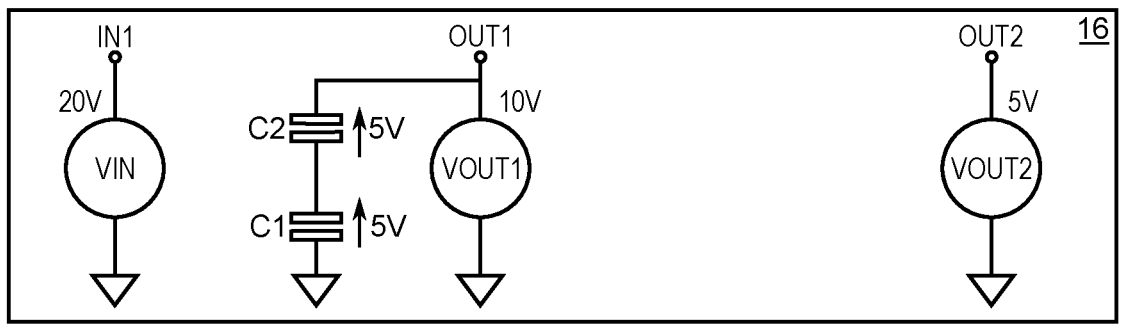
FIG. 5 (PHASE 1)
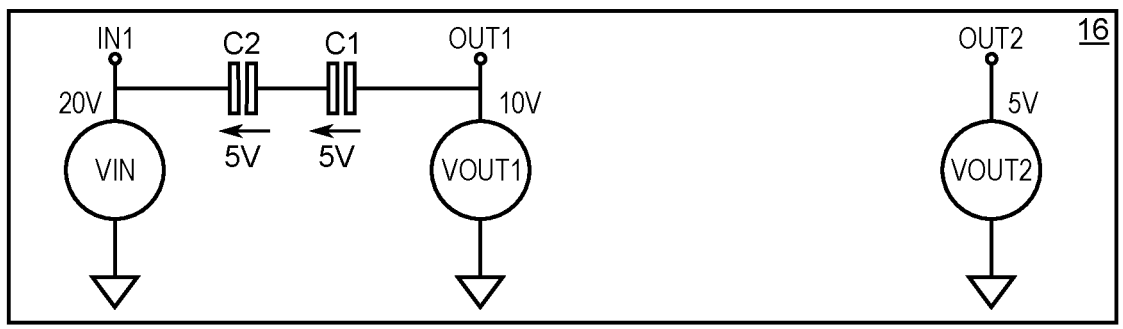
FIG. 6 (PHASE 2)
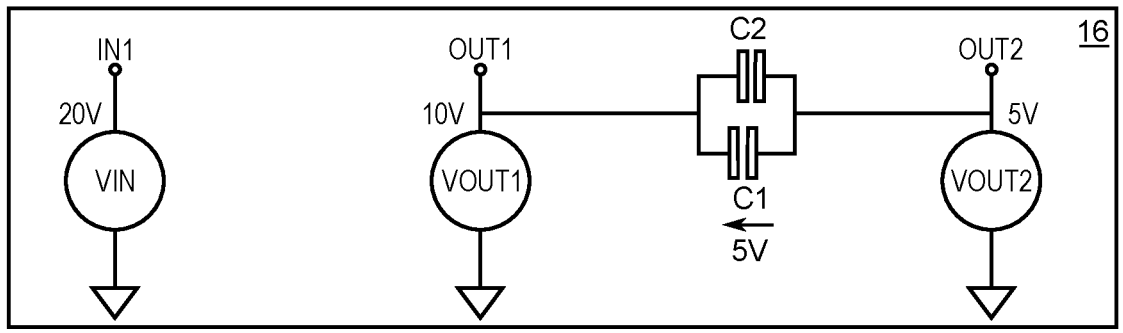
FIG. 7 (PHASE 3)
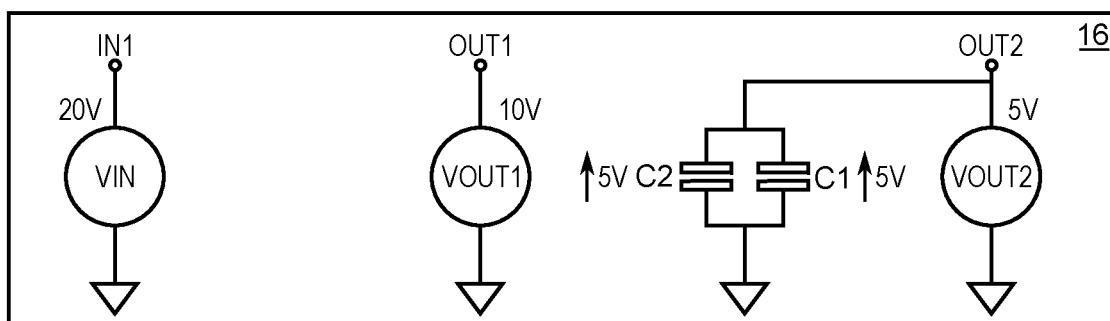
FIG. 8 (PHASE 4)

DIRECT CURRENT-TO-DIRECT CURRENT CONVERSION SYSTEM

FIELD OF THE DISCLOSURE

The present disclosure relates to converting power required by electronic systems from one voltage level to another. In particular, the present disclosure relates to a dual function direct current (DC)-to-DC switched capacitor conversion systems having two separate voltage outputs.

BACKGROUND

The amount of time a cellular handset can operate on a fully charged battery conflicts with the increasing consumer demand for more features and smaller handsets. To keep up with the power requirements brought about by these consumer demands, the cellular handset industry has turned to advanced higher capacity battery technology. However, a trade-off exists in that an advanced battery can be discharged to a lower operating voltage than typical batteries. The lower operating voltage is incompatible with existing power amplifier (PA) technology that is used in some of the basic building blocks of cellular handset circuitry. To solve this lower voltage incompatibility issue, the cellular handset industry has turned to direct current (DC)-to-DC conversion technology to boost the voltage of advanced batteries to a level that is compatible with existing PA technology. Moreover, it is widely recognized that DC-DC conversion technology is generally much more efficient at regulating output voltage than typical linear voltage regulator technology. Thus, DC-DC conversion technology offers increased efficiency that can provide longer handset operation time or smaller handsets while stepping up the voltage for compatibility with existing PA technology. However, traditional DC-DC conversion technology employed in dual function DC-DC conversion systems with two separate voltage outputs have relatively high component counts. Therefore, there is a need reduce component count in dual function DC-DC conversion systems.

SUMMARY

A direct current-to-direct current conversion system is disclosed having a switch network configured to respond to control signals to selectably couple a first capacitor and a second capacitor between an input, a first output, and a second output. Also included is a switch controller configured to signal the switch network to couple the first capacitor and the second capacitor in series between the first output and a fixed voltage node and signal the switch network to couple the first capacitor and the second capacitor in series between the first output and the input. The switch controller is further configured to signal the switch network to couple the first capacitor and the second capacitor in parallel between the first output and the second output and signal the switch network to couple the first capacitor and the second capacitor between the second output and the fixed voltage node.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

FIG. 5 is a diagram depicting the coupling of flying capacitors with the switching network in the first phase.

FIG. 6 is a diagram depicting the coupling of the flying capacitors with the switching network in the second phase.

FIG. 7 is a diagram depicting the coupling of the flying capacitors with the switching network in the third phase.

FIG. 8 is a diagram depicting the coupling of the flying capacitors with the switching network in the fourth phase.

DETAILED DESCRIPTION

Figure 1:
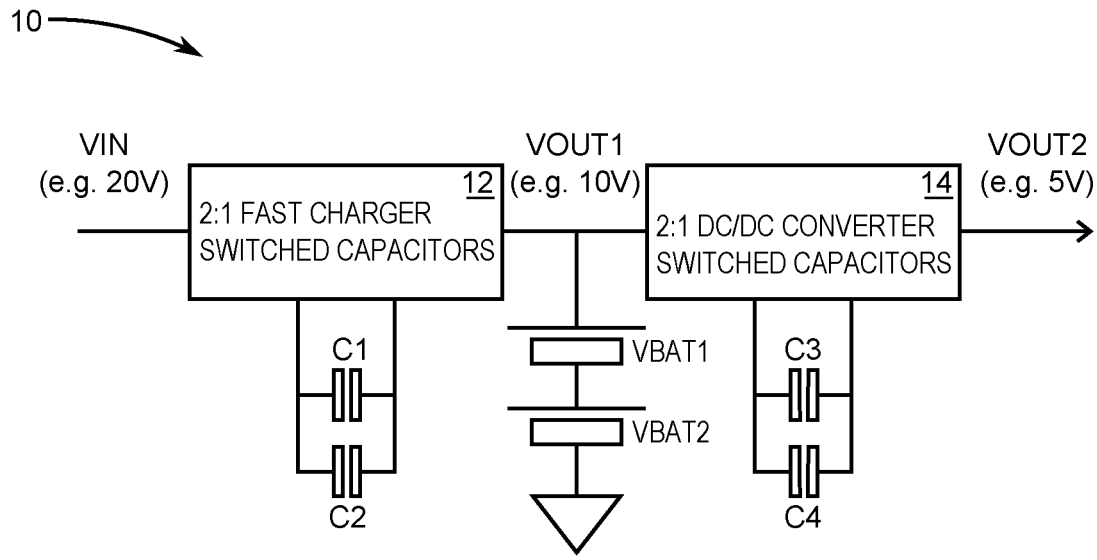
FIG. 1 depicts a related-art dual function direct current-to-direct current (DC-DC) conversion system that has two series coupled switched capacitor DC-DC converters that each have a pair of flying capacitors.

The embodiments set forth below represent the necessary information to enable those skilled in the art to practice the embodiments and illustrate the best mode of practicing the embodiments. Upon reading the following description considering the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

FIG. 1 depicts a related-art DC-DC conversion system 10 that has a first switched capacitor DC-DC converter 12 and a second switched capacitor DC-DC converter 14 that are coupled in series. The first switched capacitor DC-DC converter 12 receives an input voltage VIN and is configured to alternately charge and discharge both a first flying capacitor C1 and a second flying capacitor C2 to output a first output voltage VOUT1. The second DC-DC converter 14 receives the first output voltage VOUT1 and is configured to alternately charge and discharge both a third flying capacitor C3 and a fourth flying capacitor C4 to output a second output voltage VOUT2. The first switched capacitor DC-DC converter 12 performs a function of a battery fast charging circuit that, for example, takes the input VIN of ~20 V and downconverts VIN to VOUT1 10 V to charge a stacked two-cell lithium-ion battery depicted as VBAT1 and VBAT2. The first switched capacitor DC-DC converter 12 is based on operating with a ratio of 2:1, that is, VOUT1=½*VIN. The second switched capacitor DC-DC converter 14 performs a DC-DC conversion to downconvert the voltage VOUT1 of the stacked two-cell lithium-ion battery VBAT1 and VBAT2 from 10 V to 5 V to supply the electronic circuitry of, for example, a mobile phone.

Figure 2:
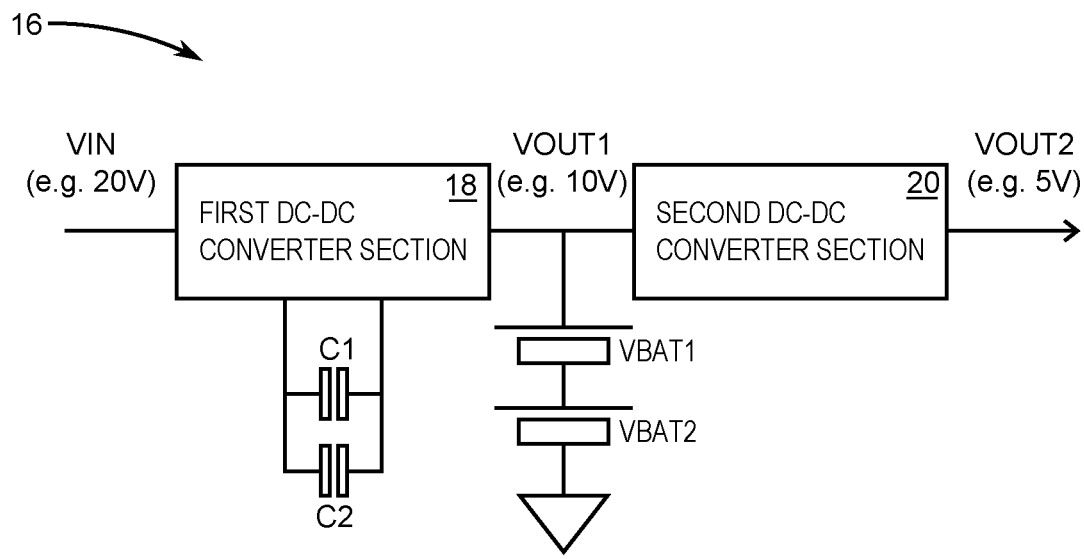
FIG. 2 depicts an exemplary embodiment of a dual function DC-DC conversion system that in accordance with the present disclosure reduces the number of flying capacitors while providing the same function as the related-art dual function conversion system depicted in FIG. 1.

FIG. 2 depicts an exemplary embodiment of a DC-DC conversion system 16 that in accordance with the present disclosure reduces the number of flying capacitors to C1 and C2 and provides the first output voltage VOUT1 and the second output voltage VOUT2. The DC-DC conversion system 16 generates simultaneously VOUT1=½ VIN and VOUT2=¼*VIN and re-uses the same flying capacitors C1 and C2, where four phases are used to simultaneously generate both outputs VOUT1 and VOUT2. The DC-DC conversion system 16 has a first DC-DC converter section 18 that is configured to provide a first function that converts the input voltage VIN from either a wireless receiver charger and/or from a USB type C charger such as a 20 V or higher charger to the first voltage VOUT1 that is usable, for example, to charge a stacked two-cell lithium-ion battery VBAT1 and VBAT2 to 10 V. The DC-DC conversion system 16 has a second DC-DC converter section 20 that is configured to simultaneously provide a second function that performs a DC-DC buck conversion to generate the output voltage VOUT2 of 5 V that is usable, for example, to supply mobile phone electronics and other power management circuitries. At least one advantage of the DC-DC conversion system 16 is a smaller volumetric size than the related-art DC-DC conversion 10 (FIG. 1) due to a reduction of in number of switching elements by retaining only the first flying capacitor C1 and the second flying capacitor C2. In other words, the DC-DC conversion system 16 eliminates the third flying capacitor C3 and the fourth flying capacitor C4, which in turn eliminates associated switching elements and control complexity of the associated switching elements.

Figure 3:
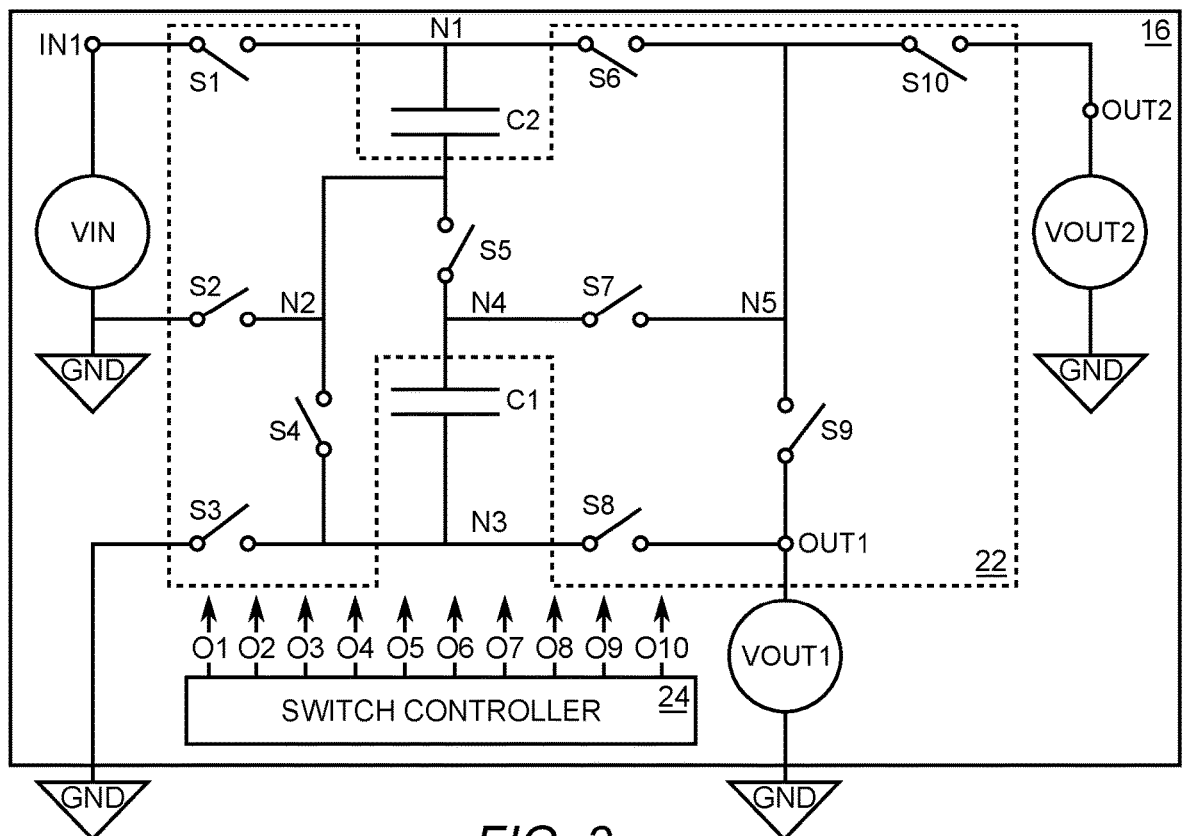
FIG. 3 depicts an exemplary embodiment of a switch network and controller that can comprise the exemplary embodiment dual function DC-DC conversion system depicted in FIG. 2.

FIG. 3 depicts an exemplary embodiment of a switch network 22 and a switch controller 24 that can comprise the exemplary embodiment of the DC-DC conversion system 16 depicted in FIG. 2. The switch network 22 has a first switch S1 coupled between an input IN1 and a first node N1, and a second switch S2 coupled between a fixed voltage node, such as GND and a second node N2. The switch network 22 also includes a third switch S3 coupled between the fixed voltage node GND and a third node N3 and a fourth switch S4 coupled between the second node N2 and the third node N3. A fifth switch S5 is coupled between the second node N2 and a fourth node N4, and a sixth switch S6 is coupled between the first node N1 and a fifth node N5. A seventh switch S7 is coupled between the fourth node N4 and the fifth node N5, and an eighth switch S8 is coupled between the third node N3 and a first output OUT1. A ninth switch S9 is coupled between the fifth node N5 and the first output OUT1, and a tenth switch S10 is coupled between the fifth node N5 and a second output OUT2. The switches S1-S10 are electronic switches and may be field-effect transistors.

An exemplary embodiment of the switch controller 24 is configured to generate switch control signals that drive the switches S1-S10 between a conductive state ON and a non-conductive state OFF. In the exemplary embodiment, a first switch control signal O1 drives the first switch S1, while a second switch control signal O2 drives the second switch S2, and a third control signal O3 drives the third switch S3. A fourth switch control signal O4 drives the fourth switch S4, a fifth switch control signal O5 drives the fifth switch S5, and a sixth control signal O6 drives the sixth switch S6. A seventh switch control signal O7 drives the seventh switch S7, and an eighth switch control signal O8 drives the eighth switch S8. A ninth switch control signal O9 drives the ninth switch S9, and a tenth control signal O10 drives the tenth switch S10. It is to be understood that ten control lines carrying the ten switch control signals may be replaced by one control line if each of the switches S1-S10 has address decoder logic and that each of the switch control signals O1-O10 are transmitted serially with an individual logic address value for each one of switches S1-S10.

Figure 4:
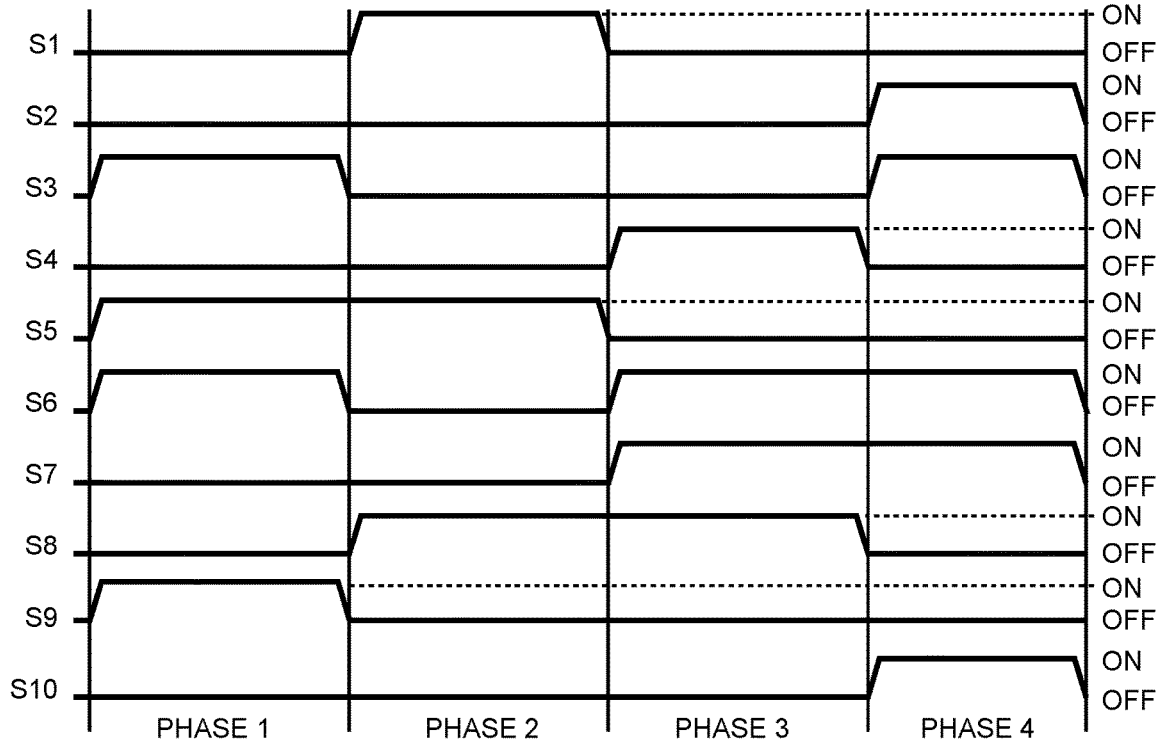
FIG. 4 is a switching phase diagram showing a first phase, a second phase, a third phase, and a fourth phase for the switch network depicted in FIG. 3.

FIG. 4 is a switching phase diagram showing a first phase, a second phase, a third phase, and a fourth phase for the switch network 22 depicted in FIG. 3. The switch controller 24 is configured to drive each of the switches S1-S10 between the conductive state ON and the non-conductive state OFF for each of the first phase, the second phase, the third phase, and the fourth phase.

FIG. 5 is a diagram depicting the coupling of the first flying capacitor C1 and the second flying capacitor C2 with the switch network 22 in the first phase. In the first phase, the first flying capacitor C1 and the second flying capacitor C2 are coupled in series between the fixed voltage node GND and the first output voltage OUT1.

FIG. 6 is a diagram depicting the coupling of the first flying capacitor C1 and the second flying capacitor C2 with the switch network 22 in the second phase. In the second phase, the first flying capacitor C1 and the second flying capacitor C2 are coupled in series between the input voltage VIN and the first output voltage OUT1.

FIG. 7 is a diagram depicting the coupling of the first flying capacitor C1 and the second flying capacitor C2 with the switch network 22 in the third phase. In the third phase, the first flying capacitor C1 and the second flying capacitor C2 are coupled in parallel between the first output voltage OUT1 and the second output voltage VOUT2.

FIG. 8 is a diagram depicting the coupling of the first flying capacitor C1 and the second flying capacitor C2 with the switch network 22 in the fourth phase. In the fourth phase, the first flying capacitor C1 and the second flying capacitor C2 are coupled in parallel between the fixed voltage node GND and the second output OUT2.

Figure 9:
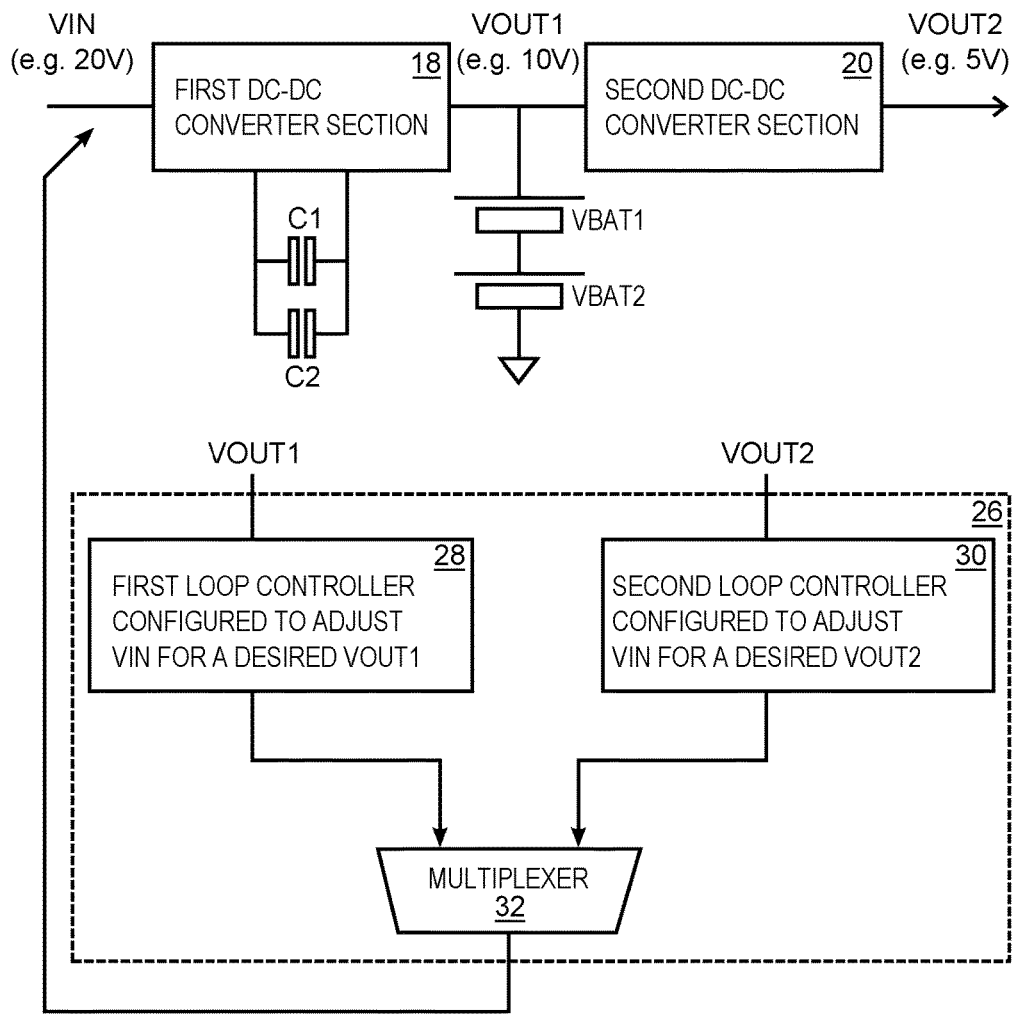
FIG. 9 is a diagram of an exemplary embodiment of the DC-DC conversion system that includes loop control elements.

FIG. 9 is a diagram of an exemplary embodiment of the DC-DC conversion system 16 that includes loop control elements 26. In this exemplary embodiment, a first loop controller 28 is configured to adjust a voltage level of an input voltage at the input voltage VIN to achieve a desired output voltage level of a first output voltage at the first voltage output OUT1. A second loop controller 30 is configured to adjust a voltage level of an input voltage at the input voltage VIN to achieve a desired output voltage level of a second output voltage at the second voltage output OUT2. A multiplexer 32 is configured to combine adjusting signals from the first loop controller 28 into a common adjusting signal.

Operation of the DC-DC conversion system 16 is substantially efficient, given that the input voltage VIN is normally adjusted to keep a VIN/VOUT1 or VIN/VOUT2 ratio constant. The loop control elements 26 that adjust the input voltage VIN are used to maintain the VIN/VOUT1 ratio and/or the VIN/VOUT2 ratio constant. This is required given, for example, that the stacked two-cell lithium-ion battery VBAT1 and VBAT2 voltage can be discharged to, for example, 2*3 V=6 V. Thus, the input voltage Vin is adjusted to 2:1*6 V=12 V instead of 20 V. The loop control elements 26 can be either set relative to voltage at the first output voltage VOUT1 or can be set relative to the second output voltage VOUT2, depending on the application requirements, as shown in the embodiment of FIG. 9.

The embodiment in accordance with the present disclosure can be generalized to other switch capacitor ratios such that a single switch capacitor with multiple outputs of different ratios such as {x, 2x, 1−x, 1} for buck, and {1+x, 2−x, 2} for boost is possible, with x being the programmed ratio x=VOUT/VIN.

Figure 10:
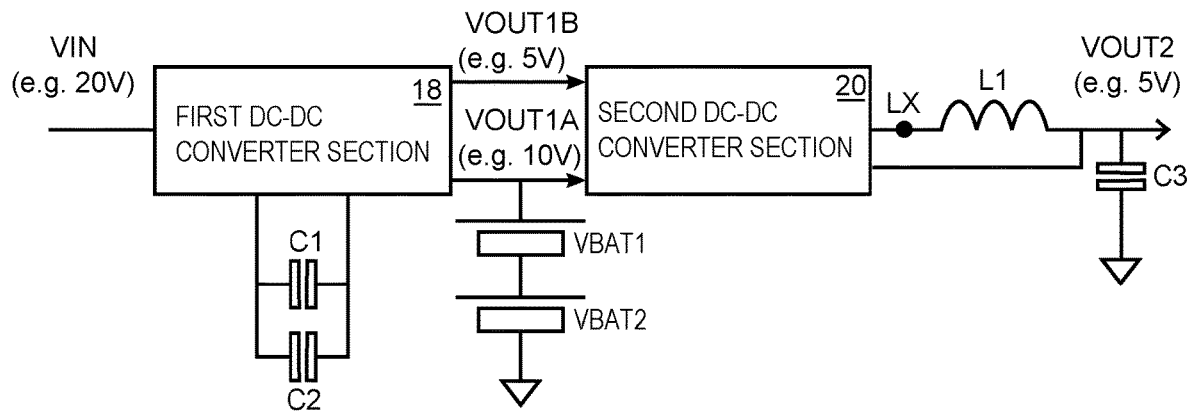
FIG. 10 is a diagram of an exemplary embodiment of the DC-DC conversion system that provides a multilevel buck function.

The exemplary embodiments in accordance with the present disclosure also can be generalized such that the second output voltage VOUT2 can be based on a buck inductor-based converter function in which an LX node is driven by multi-level inputs such as VOUT1A and VOUT1B, for example, and generates multiple outputs, one for a battery fast charger for VBAT1 and VBAT2 and one for the LX level, as shown in FIG. 10. An inductor L1 is coupled between the second voltage output OUT2 (i.e., the LX node) and a third capacitor C3 coupled to the fixed voltage node.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A direct current-to-direct current (DC-DC) conversion system comprising:
   a switch network configured to respond to control signals to selectably couple a first capacitor and a second capacitor between a voltage input, a first voltage output, and a second voltage output;
   a switch controller configured to:
      signal the switch network to couple the first capacitor and the second capacitor in series between the first voltage output and a fixed voltage node;
      signal the switch network to couple the first capacitor and the second capacitor in series between the first voltage output and the voltage input;
      signal the switch network to couple the first capacitor and the second capacitor in parallel between the first voltage output and the second voltage output; and
      signal the switch network to couple the first capacitor and the second capacitor between the second voltage output and the fixed voltage node; and
   a first loop controller that is configured to adjust a voltage level of an input voltage at the voltage input to achieve a desired output voltage level of a first output voltage at the first voltage output; and a second loop controller that is configured to adjust a voltage level of an input voltage at the voltage input to achieve a desired output voltage level of a second output voltage at the second voltage output.

2. The DC-DC conversion system of claim 1 wherein the signal to the switch network to couple the first capacitor and the second capacitor in series between the first voltage output and the fixed voltage node is generated by the switch controller in a first phase.

3. The DC-DC conversion system of claim 1 wherein the signal to the switch network to couple the first capacitor and the second capacitor in series between the first voltage output and the voltage input is generated by the switch controller in a second phase.

4. The DC-DC conversion system of claim 1 wherein the signal to the switch network to couple the first capacitor and the second capacitor in parallel between the first voltage output and the second voltage output is generated by the switch controller in a third phase.

5. The DC-DC conversion system of claim 1 wherein the signal to the switch network to couple the first capacitor and the second capacitor between the second voltage output and the fixed voltage node is generated by the switch controller in a fourth phase.

6. The DC-DC conversion system of claim 1 wherein the fixed voltage node is ground.

7. The DC-DC conversion system of claim 1 wherein the first loop controller is configured to maintain a constant ratio between the input voltage at the voltage input and the first output voltage at the first voltage output.

8. The DC-DC conversion system of claim 1 wherein the first loop controller is configured to maintain a constant ratio between the input voltage at the voltage input and the second output voltage at the second voltage output.

9. The DC-DC conversion system of claim 1 further comprising an inductor coupled between the second voltage output and a third capacitor coupled to the fixed voltage node.

10. A method of controlling a direct current-to-direct current (DC-DC) conversion system having a switch network configured to respond to control signals to selectably couple a first capacitor and a second capacitor between a voltage input, a first voltage output, and a second voltage output, the method comprising:

signaling the switch network to couple the first capacitor and the second capacitor in series between the first voltage output and a fixed voltage node;

signaling the switch network to couple the first capacitor and the second capacitor in series between the first voltage output and the voltage input;

signaling the switch network to couple the first capacitor and the second capacitor in parallel between the first voltage output and the second voltage output;

signaling the switch network to couple the first capacitor and the second capacitor between the second voltage output and the fixed voltage node;

adjusting by way of a first loop controller a voltage level of an input voltage at the voltage input to achieve a desired output voltage level of a first output voltage at the first voltage output; and adjusting by way of a second loop controller a voltage level of an input voltage at the voltage input to achieve a desired output voltage level of a second output voltage at the second voltage output.

11. The method of controlling the DC-DC conversion system of claim 10 wherein the signaling of the switch network to couple the first capacitor and the second capacitor in series between the first voltage output and the fixed voltage node is generated in a first phase by a switch controller.

12. The method of controlling the DC-DC conversion system of claim 10 wherein the signaling of the switch network to couple the first capacitor and the second capacitor in series between the first voltage output and the voltage input is generated in a second phase by a switch controller.

13. The method of controlling the DC-DC conversion system of claim 10 wherein the signaling of the switch network to couple the first capacitor and the second capacitor in parallel between the first voltage output and the second voltage output is generated in a third phase by a switch controller.

14. The method of controlling the DC-DC conversion system of claim 10 wherein the signaling of the switch network to couple the first capacitor and the second capacitor between the second voltage output and the fixed voltage node is generated in a fourth phase by a switch controller.

15. The method of controlling the DC-DC conversion system of claim 10 wherein the fixed voltage node is ground.

16. The method of controlling the DC-DC conversion system of claim 10 further comprising maintaining by way of the first loop controller a constant ratio between the input voltage at the voltage input and the first output voltage at the first voltage output.

17. The method of controlling the DC-DC conversion system of claim 10 further comprising maintaining by way of the second loop controller a constant ratio between the input voltage at the voltage input and the second output voltage at the second voltage output.

18. The method of controlling the DC-DC conversion system of claim 10 wherein an inductor is coupled between the second voltage output and a third capacitor coupled to the fixed voltage node.

* * * * *